(12) United States Patent
Dorrer et al.

(10) Patent No.: US 7,336,728 B2
(45) Date of Patent: Feb. 26, 2008

(54) METHOD AND APPARATUS FOR MONITORING PHASE-SHIFT KEYED OPTICAL SIGNALS

(75) Inventors: Christophe J Dorrer, Matawan, NJ (US); Xiang Liu, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 686 days.

(21) Appl. No.: 10/835,023

(22) Filed: Apr. 29, 2004

(65) Prior Publication Data

US 2005/0243907 A1 Nov. 3, 2005

(51) Int. Cl.
*H04L 27/20* (2006.01)
(52) U.S. Cl. ............... 375/308; 375/226; 375/296
(58) Field of Classification Search ............ 375/308, 375/296, 279, 284, 224, 226, 227
See application file for complete search history.

(56) References Cited

U.S. PATENT DOCUMENTS 5,048,054 A * 9/1991 Eyuboglu et al. ........... 375/222
5,274,697 A * 12/1993 Schroeder et al. ......... 379/93.31

OTHER PUBLICATIONS

A. Gnauck, "40-Gb/s RZ-Differential Phase Shift Keyed Transmission, *Optical Fiber Communications Conference*", vol. 2, 2003, pp. 450-451.
T. Chikama et al., "Modulation And Demodulation Techniques in Optical Heterodyne PSK Transmission Systems", *J. Lightwave Technology*, vol. 8, 1990, pp. 309-322.
J. Basak et al., "WDM Pilot Tone Technique For Analogue Optical Links", *Electronic Letters*, vol. 39, No. 14, 2003, pp. 1083-1084.
Q. Jiang et al., "A Subcarrier-Multiplexed Coherent FSK System Using A Mach-Zehnder Modulator With Automatic Bias Control", *IEEE Photonics Technology Letters*, vol. 5, 1993, pp. 941-943.
T. Kataoka et al., "Novel Automatic Bias Voltage Control For Travelling-Wave Electrode Optical Modulators", *Electronics Letters*, vol. 27, 1991, pp. 943-945.
B. P. Lathi, *Modern Digital And Analog Communication Systems*", Oxford University Press, 3rd Edition, 1995.

* cited by examiner

*Primary Examiner*—Kevin Kim

(57) ABSTRACT

A method and apparatus for monitoring PSK optical signals by measuring the RF spectrum of the signal and determining the power spectral density of noise on the optical signal within a predetermined frequency range to determine a measure of the degradation of the optical signal.

31 Claims, 8 Drawing Sheets

METHOD AND APPARATUS FOR MONITORING PHASE-SHIFT KEYED OPTICAL SIGNALS

BACKGROUND OF THE INVENTION

1. Field of the Invention

The invention generally relates to the field of optical telecommunications, and more particularly to the monitoring of phase-shift keyed (PSK) optical signals.

2. Description of the Related Art

Optical telecommunications rely on data-encoding of information in the amplitude and/or phase of light from an optical source. Various methods for encoding information are known in the art. For example, analog modulation directly encodes the information as a continuous variable on the source of light. Digital communication encodes a digitized version of the information where discrete levels of a variable in the encoded source, for example the amplitude of the pulses, correspond to bits of information. Regardless of the choices made for the encoding, noise from various sources can potentially deteriorate the quality of the information encoded on the channel, and can lead to errors in the transmission of information. Therefore, being able to optimize a transmitter for optimal performance and quantifying the apparition of noise on a channel during transmission are crucial tasks when operating an optical telecommunication network.

Various optical monitoring techniques are known and, for example, are used to track the amount of amplified spontaneous emission present on a channel. Most impairments modify both the temporal intensity and phase of the electric field of an optical channel. While such temporal intensity is modulated by the data encoding process in an amplitude shift keyed (ASK) signal, the intensity is expected to be a periodic function of time (with a periodicity equal to the bit period) in the case of a phase shift keyed (PSK) signal. Therefore, any non-periodic behavior of the temporal intensity is a sign of impairment in a PSK channel. Such a property and various derivations can be put in practice to monitor phase-shift keyed signals.

SUMMARY OF THE INVENTION

The present invention provides methods and apparatus for monitoring phase-encoded optical signals. In one embodiment of the present invention, a method is provided for monitoring an optical PSK signal including measuring the RF spectrum of the PSK signal and determining the power spectral density of noise on the PSK signal within one or more frequency ranges excluding the clock frequency and harmonics of the clock frequency.

In another embodiment of the present invention, a method is provided for monitoring ASE on an optical PSK signal. The method includes measuring the RF spectrum of the PSK signal and determining the power spectral density of ASE noise on the PSK signal within a predetermined frequency range.

In another embodiment of the present invention, a method is provided for monitoring the bias drift of a PSK data modulator. The method includes measuring the RF spectrum of a PSK signal generated by the PSK data modulator, determining the power spectral density of the PSK signal within a predetermined frequency range and determining the degradation of the PSK signal due to the bias drift of the PSK data modulator based on the spectral density within the predetermined frequency range.

In still another embodiment of the present invention, a method is provided for controlling the bias of a PSK data modulator. The method includes measuring the RF spectrum of a PSK signal generated by the PSK data modulator, determining the power spectral density of the PSK signal within a predetermined frequency range, and adjusting the bias of the PSK data modulator to reduce amplitude fluctuation from the PSK data modulator.

In still another embodiment of the present invention, an apparatus for monitoring an optical PSK signal is provided comprising, a means for measuring the RF spectrum of the PSK signal, and a means for determining the power spectral density of noise on the PSK signal within one or more frequency ranges excluding the clock frequency and harmonics of the clock frequency.

In still another embodiment of the present invention, an apparatus for monitoring ASE on an optical PSK signal is provided comprising a means for measuring the RF spectrum of the PSK signal, and a means for determining the power spectral density of ASE noise on the PSK signal within a predetermined frequency range.

In still another embodiment of the present invention, an apparatus for monitoring the bias drift of a PSK data modulator is provided comprising a means for determining the power spectral density of a PSK signal generated by the PSK data modulator within a predetermined frequency range, and a means for determining the degradation of the PSK signal due to the bias drift of the PSK data modulator based on the power spectral density within the predetermined frequency range.

In still another embodiment of the present invention, an apparatus for controlling the bias of a PSK data modulator is provided comprising a means for determining the power spectral density of a PSK signal generated by the PSK data modulator within a predetermined frequency range, and a means for adjusting the bias of the PSK data modulator based on the power spectral density of the PSK signal within the predetermined frequency range.

BRIEF DESCRIPTION OF THE DRAWINGS

The foregoing and other objects, features and advantages of the present invention will become more apparent from the following detailed description when taken in conjunction with the appended drawings.

It is to be noted, however, that the appended drawings illustrate only exemplary embodiments of the invention and are therefore not to be considered as limiting of the scope of the invention.

DETAILED DESCRIPTION

Various methods and apparatus for monitoring phase-encoded optical sources are described. One or more aspects of the invention relate to the use of RF spectrum analysis of an optical source to quantify the noise introduced by impairments. Other aspects of the invention relate to the use of RF spectrum analysis of an optical source to optimize the phase-encoding on the optical source.

A phase-shift keyed signal without impairment has a substantially periodic temporal intensity described as a sum of elementary pulses, with temporal intensity $I_{PULSE}$, centered at the times nT, where T is the period of the signal. The intensity is therefore:

$$I(t) = \sum_n I_{PULSE}(t - nT) \tag{1}$$

As the square-law photodetectors that are commonly used are only sensitive to the intensity of an optical signal, and not to its phase, a phase-shift keyed signal incident on a photodetector generates a periodic current representative of the previous optical intensity. RF analysis of such photocurrent is described by the following steps. The Fourier transform of such intensity is calculated as:

$$\tilde{I}(\Omega) = \int I(t) \exp(i\Omega t) dt \tag{2}$$

Where all integrals extend from $-\infty$ to $+\infty$.

This can be calculated as $$\tilde{I}(\Omega) = \tilde{I}_{PULSE}(\Omega) \sum_n \delta\left(\Omega - \frac{2\pi n}{T}\right) \tag{3}$$

where $\delta$ represents the Dirac function. The frequency representation of such an unimpaired signal, as expressed by Eq. 3, is therefore the product of the continuous function $\tilde{I}$ with a function taking non-zero values uniquely at the frequency of the clock $$\frac{2\pi}{T}$$

and its harmonics $$\frac{2\pi}{T}n.$$

It is therefore non-zero only at these discrete values of the frequency $\Omega$.

The RF spectrum of a signal is by definition the modulus square of the Fourier transform of the signal, and is therefore for the unimpaired signal:

$$S(\Omega) = S_{PULSE}(\Omega) \sum_n \delta\left(\Omega - \frac{2\pi n}{T}\right) \tag{4}$$

where $S_{PULSE}$ is the RF spectrum of the fundamental pulse.

Figure 1:
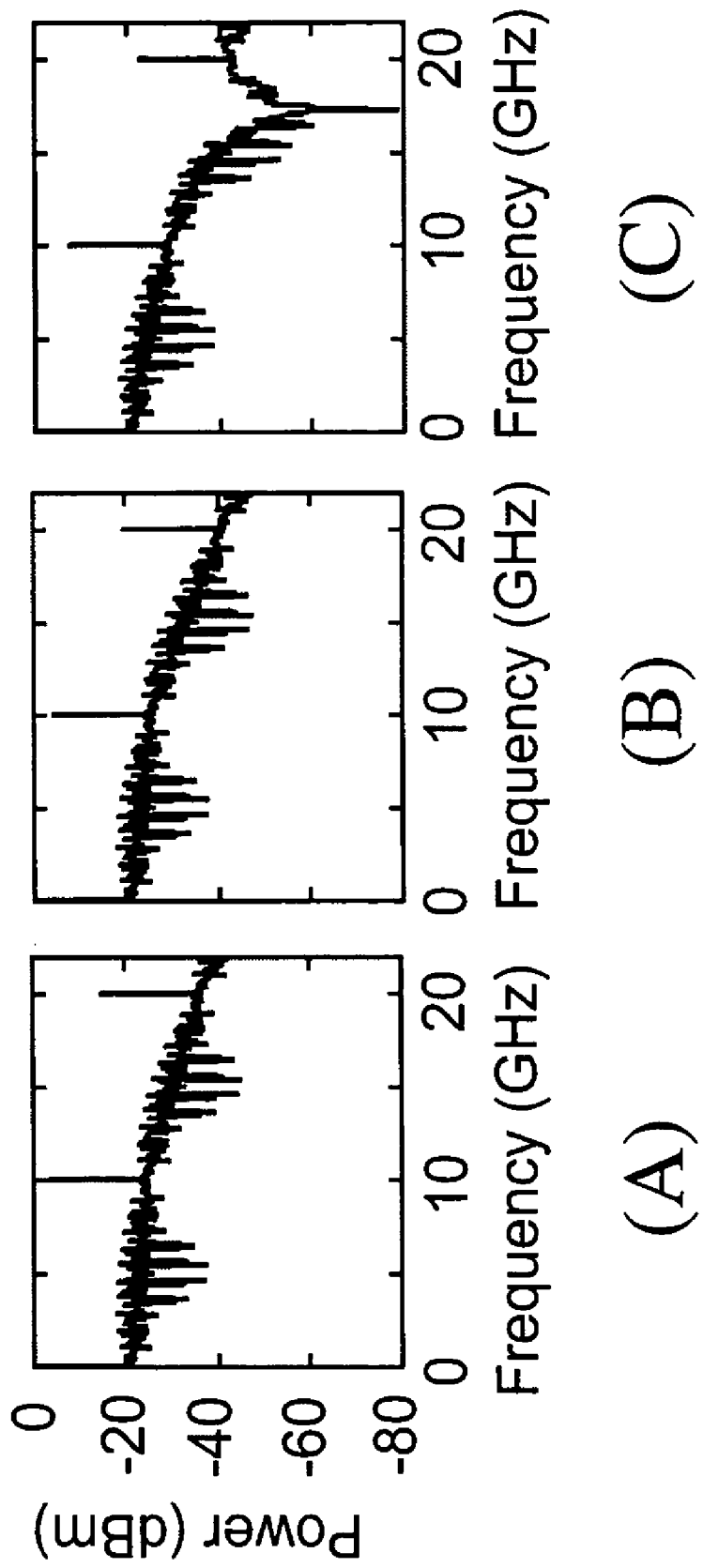
FIGS. 1A-C are plots of the RF spectrum of on-off keyed signals with 3 different pulse formats.
Figure 2:
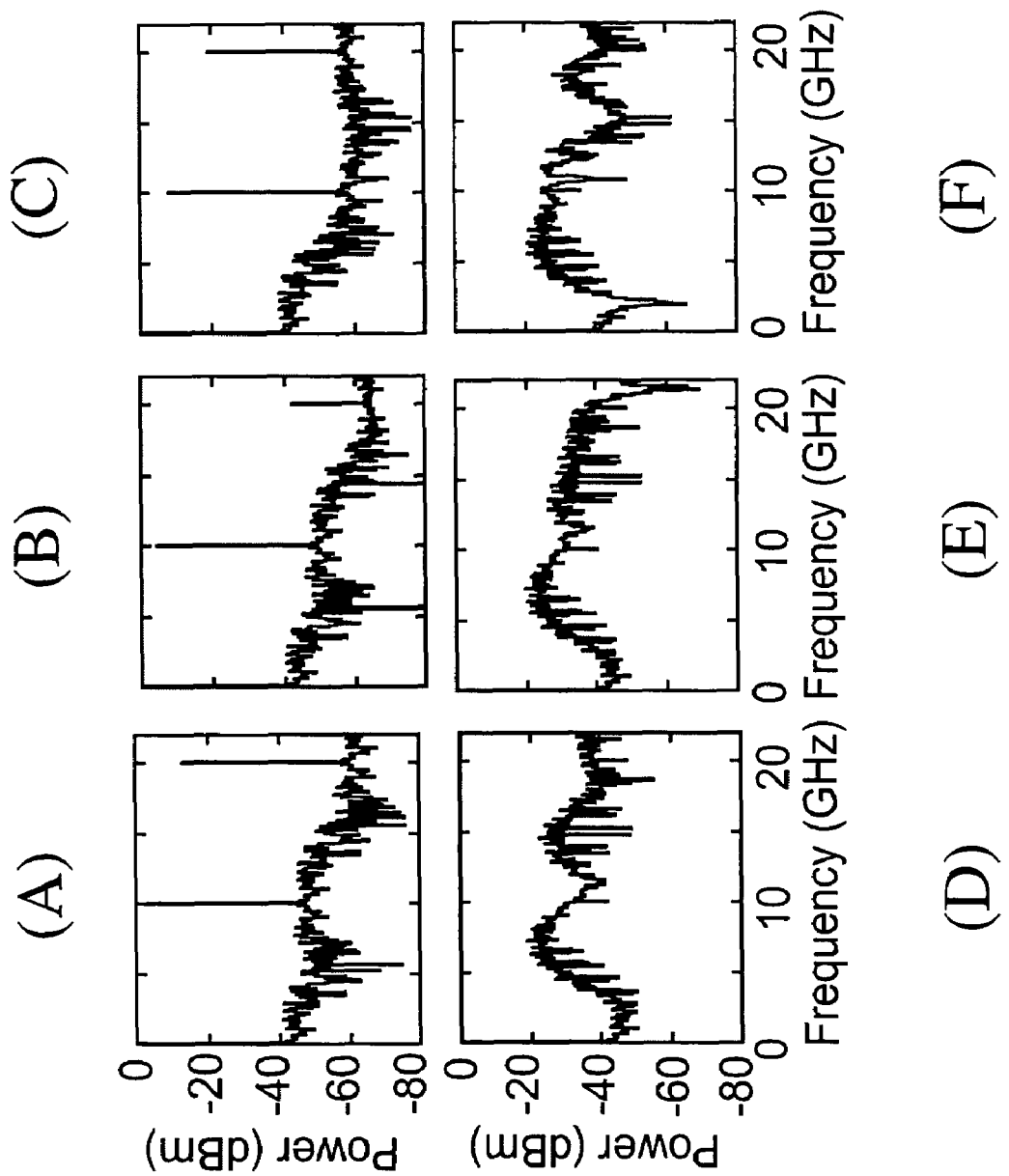
FIGS. 2A-F are plots of the RF spectrum of PSK signals with 3 different pulse formats, without and with chromatic dispersion.

The RF spectrum of a non-impaired PSK signal is therefore non-zero only at the clock frequency and its harmonics. This property is typical of PSK signals. OOK signals do not behave similarly. For example, the RF spectrum of OOK signals with pulse formats equal to 33% RZ, 50% RZ and 67% CSRZ are displayed in FIGS. 1A-C, respectively. From the figures, it is apparent that significant spectral density is present at most RF frequencies.

The properties of the RF spectrum of PSK signals can be used to implement monitoring techniques for PSK signals based on their RF spectrum. Essentially, these techniques are able to detect the RF spectrum of an impairment because impairments modify the temporal intensity of the PSK signal in a non-periodic manner. Therefore, the spectral density of an impaired PSK signal can be detected at frequencies other than the clock or its harmonics.

In one embodiment of the present invention, the RF spectrum of a PSK signal is used to detect a non-periodic behavior of the temporal intensity, which will be referred to as noise. As used herein, a "PSK" signal can be a non-differential PSK signal, a differential PSK signal, or the like.

For such an impaired PSK signal, the temporal intensity can be written as $$I(t) = \sum_n I_{PULSE}(t - nT) + N(t) \tag{5}$$

where N(t) represents a non-periodic time evolution of the intensity.

The frequency representation of such source is therefore:

$$\tilde{I}(\Omega) = \tilde{I}_{PULSE}(\Omega) \sum_n \delta\left(\Omega - \frac{2\pi n}{T}\right) + \tilde{N}(\Omega) \tag{6}$$

The RF spectrum of such source is then:

$$S(\Omega) = S_{PULSE}(\Omega) \sum_n \delta\left(\Omega - \frac{2\pi n}{T}\right) + |\tilde{N}(\Omega)|^2 + \tag{7}$$

$$S_{PULSE}(\Omega) \sum_n \delta\left(\Omega - \frac{2\pi n}{T}\right) \tilde{N}^*(\Omega) + S^*_{PULSE}(\Omega) \sum_n \delta\left(\Omega - \frac{2\pi n}{T}\right) \tilde{N}(\Omega)$$

where one can recognize in the first term the RF spectrum of the periodic signal, in the second term the RF spectrum of the noise, and in the third and fourth terms the crossed terms between the spectral representations of the periodic signal and non-periodic noise. Because of the presence of the Dirac functions $$\delta\left(\Omega - \frac{2\pi n}{T}\right),$$

the first, third and fourth terms in Eq. 7 are non-zero only at the clock and its harmonics. The RF spectrum of the impaired signal S(Ω) is therefore equal to the RF spectrum of the noise $|\tilde{N}(\Omega)|^2$ at all RF frequencies Ω not equal to the clock or its harmonics, following the equation:

$$S(\Omega) = |N(\Omega)|^2 \text{ for } \Omega \neq \frac{2\pi n}{T} \quad (8)$$

Therefore, a qualitative measure of the importance of impairment can be obtained using the RF spectrum of the impaired PSK signal. This can be usefully employed by, for example, considering the spectral density of the signal in one or several ranges of frequencies not including the clock frequency or its harmonics.

In another embodiment of the present invention, a method and apparatus to track the noise arising from amplified spontaneous emission (ASE) are proposed and demonstrated.

ASE is added on the signal by the amplification process commonly used in optical telecommunication systems. It is inherent to the amplification process, and is a major source of impairment in optical networks. The sum $\vec{E}(t)$ of a channel with vectorial electric field $\vec{E}_1(t)$ and ASE with vectorial field $\vec{E}_2(t) = \vec{E}_{2,1}(t) + \vec{E}_{2,2}(t)$, where $\vec{E}_{2,1}(t)$ is by definition the projection of the field $\vec{E}_2(t)$ onto the direction of the vector $\vec{E}_1(t)$, and $\vec{E}_{2,2}(t)$ is orthogonal to $\vec{E}_1(t)$. We assume that $\vec{E}_2$ is incoherent and $\vec{E}_1$ and $\vec{E}_2$ are mutually incoherent. The RF spectrum is given by the modulus square of the Fourier transform of the temporal intensity, i.e.

$$S(\Omega) = \frac{1}{(2\pi)^2} \left\langle \left| \int I(t) \cdot \exp(i\Omega t) dt \right|^2 \right\rangle \quad (9)$$

$$= \frac{1}{(2\pi)^2} \int \int \langle I(t) \cdot I(t') \rangle \cdot \exp[i\Omega \cdot (t-t')] dt dt'$$

where the brackets represent the average over all realizations of the processes $\vec{E}_1$ and $\vec{E}_2$. Such formalism will allow the calculation of average values over the realization of non-deterministic processes, such as the ASE. The temporal intensity is $I(t) = I_1(t) + E_1(t) \cdot E_{2,1}^*(t) + E_1^*(t) \cdot E_{2,1}(t) + I_2(t)$, using the facts that $I_2(t) = |\vec{E}_{2,1}(t)|^2 + |\vec{E}_{2,2}(t)|^2$ and that $\vec{E}_1(t)$ and $\vec{E}_{2,1}(t)$ are collinear. The RF spectrum can be developed as the sum of 16 double integrals, from which 11 average to zero under our assumptions, and one gets:

$$S(\Omega) = S_1(\Omega) + S_2(\Omega) + S_{1,2}(\Omega) \quad (10)$$

where $S_1$ and $S_2$ are respectively the RF spectra of the channel and the ASE and $S_{1,2}$ is the RF spectrum of the signal-ASE beat-noise. Using the spectral density of the signal $I_1(\omega)$ and ASE $I_2(\omega)$ defined with the Wiener-Khintchine theorem, $S_{1,2}$ can be expressed as:

$$S_{1,2}(\Omega) = \frac{1}{2} \int I_2(\omega') \cdot I_1(\Omega + \omega') d\omega' + \frac{1}{2} \int I_2(\omega') \cdot I_1(\omega' - \Omega) d\omega' \quad (11)$$

Equation 11 assumes that the spectral density of the incoherent process measured along the direction of the field $E_1$, i.e.

$$I_{2,1}(\omega) = \frac{1}{(2\pi)^2} \int \langle E_{2,1}(t) E_{2,1}^*(t') \rangle \exp[i\omega(t-t')] dt dt',$$

is equal to half the spectral density of the process itself, i.e.

$$I_2(\omega) = \frac{1}{(2\pi)^2} \int \langle \vec{E}_2(t) \cdot \vec{E}_2^*(t') \rangle \exp[i\omega(t-t')] dt dt',$$

which is expected if, on average, half of the ASE is copolarized with the signal. As observed previously, the RF spectrum of the unimpaired signal is non-zero only for the clock and its harmonics. Note that $S_{1,2}$ only depends on the spectral density of the two sources, and does not depend on the spectral phase of the signal (i.e. the chromatic dispersion). Moreover, for a frequency Ω, which is small compared to the optical bandwidth of the two sources, one has $S_{1,2}(\Omega) \approx \int I_1(\omega) I_2(\omega) d\omega$, which only depends on the spectral overlap between the two sources. It can be concluded that a measurement of the RF spectral density of a PSK signal at low RF frequencies gives a direct access to the spectral overlap between the non-impaired signal and the amplified spontaneous emission. As used herein, "low RF frequencies" or "low frequency" range refers to frequencies that are substantially lower than the data rate of the signal, excluding the DC component. For example, in a system operating at 10 GHz, a 'low frequency range' may include frequencies less than about 5 GHz and higher than a few hertz.

Additionally, the RF spectrum of a PSK signal, which is substantially zero at all frequencies different from the clock and its harmonics, remains substantially zero at low RF frequencies even in the presence of significant dispersion. FIGS. 2A-F display the simulated RF spectrum of optical signals based on 33% RZ (A, D) 50% RZ (B, E) and 67% CSRZ (C, F) with PSK encoding without dispersion (A-C), and with 1700 ps.nm$^{-1}$ dispersion (D-F), i.e. the dispersion of 100 km of standard single-mode fiber (SSMF) at 1.55 μm. Although chromatic dispersion induces significant changes on the RF spectrum, the RF power at frequencies below 2 GHz remains unchanged. The PSK encoding is performed with a Mach-Zehnder biased at extinction. The simulation includes the limited bandwidth of the data modulator, corresponding to a reduction of the power of the modulation by 3 dB at 10 GHz compared to DC; such limitation induces some pattern dependence which is responsible for a floor on the spectral density. While an ideal signal would only have spectral density at the 10 GHz clock and its harmonics, the simulated spectral density is nonzero between the tones. However, the spectral density floor for DPSK data modulation is more than 20 dB smaller than for OOK data modulation, as can be seen by comparing the plots of FIGS. 1A-C and FIGS. 2A-F.

Those skilled in the art can appreciate that the present invention provides a method for monitoring the degradation due to ASE on a PSK signal using the spectral density of the signal in a range of RF frequencies. Advantageously, if one considers a range of frequencies that are significantly smaller than the optical bandwidth of the source, a direct measure of the spectral overlap of the ASE with the signal can be obtained. Such measure is independent of the chromatic dispersion present on the signal.

Further, the present invention can be implemented for noise monitoring at a point in the network where pulses are spread in time because of dispersion. Such an implementation may only require low-bandwidth photodetection and electronics, since it is sufficient to measure the spectral density at low RF frequencies.

In order to demonstrate a method of ASE monitoring according to the invention, an experiment was performed on a 10 Gb/s 50% RZ DPSK signal. The pulse carving was performed with a $LiNbO_3$ Mach-Zehnder modulator (MZM). The data modulation was achieved by driving a 10-Gb/s x-cut (chirp-free) $LiNbO_3$ MZM biased at null with 2 $V_\pi$ swing. The phase modulation scheme is commonly used for DPSK since it ensures that the optical phase difference between two adjacent bits is exactly 0 or $\pi$. It was understood that noise on the driving voltage and the limited bandwidth of the MZM, as mentioned previously, introduced some pattern dependent amplitude modulation. The OSNR was varied from 13 to 33 dB by attenuating the power of the signal before a preamplifier. The output signal was then amplified and filtered with a 0.8 nm wide filter, and the average power on the detector was kept constant. The monitoring was implemented with a 1 GHz detector whose output was band-pass filtered between 10 kHz and 10 MHz, amplified by a factor of 5 and sent to a heterodyne RF spectrum analyzer. The RF power around 6 MHz in a 2 MHz bandwidth was measured. Although the measurement of the RF spectral density of the optical source was implemented in the demonstration using an RF spectrum analyzer, this is not required and should not be considered as a limit of the scope of the present invention.

It is known to those skilled in the art that there exist other techniques to measure the RF spectrum of an optical source. For example, the second order intensity autocorrelation of a source, which can be obtained using the nonlinear interaction of two replicas of the source under test, is the Fourier transform of the RF spectrum. Therefore, the RF spectrum can be obtained from the second order intensity autocorrelation.

Another approach to the measurement of the RF spectrum, particularly adapted to the measurement of the spectral density at low RF frequencies, relies on the measurement of the temporal intensity of the source under test followed by a numerical Fourier transform and squaring.

To study the performance of the noise monitor to chromatic dispersion, dispersion compensating modules introducing −296 ps.nm$^{-1}$ (DCM20 for compensation of 20 km of SSMF) and −1633 ps.nm$^{-1}$ (DCM100 for compensation of 100 km of SSMF) were used.

Figure 3:
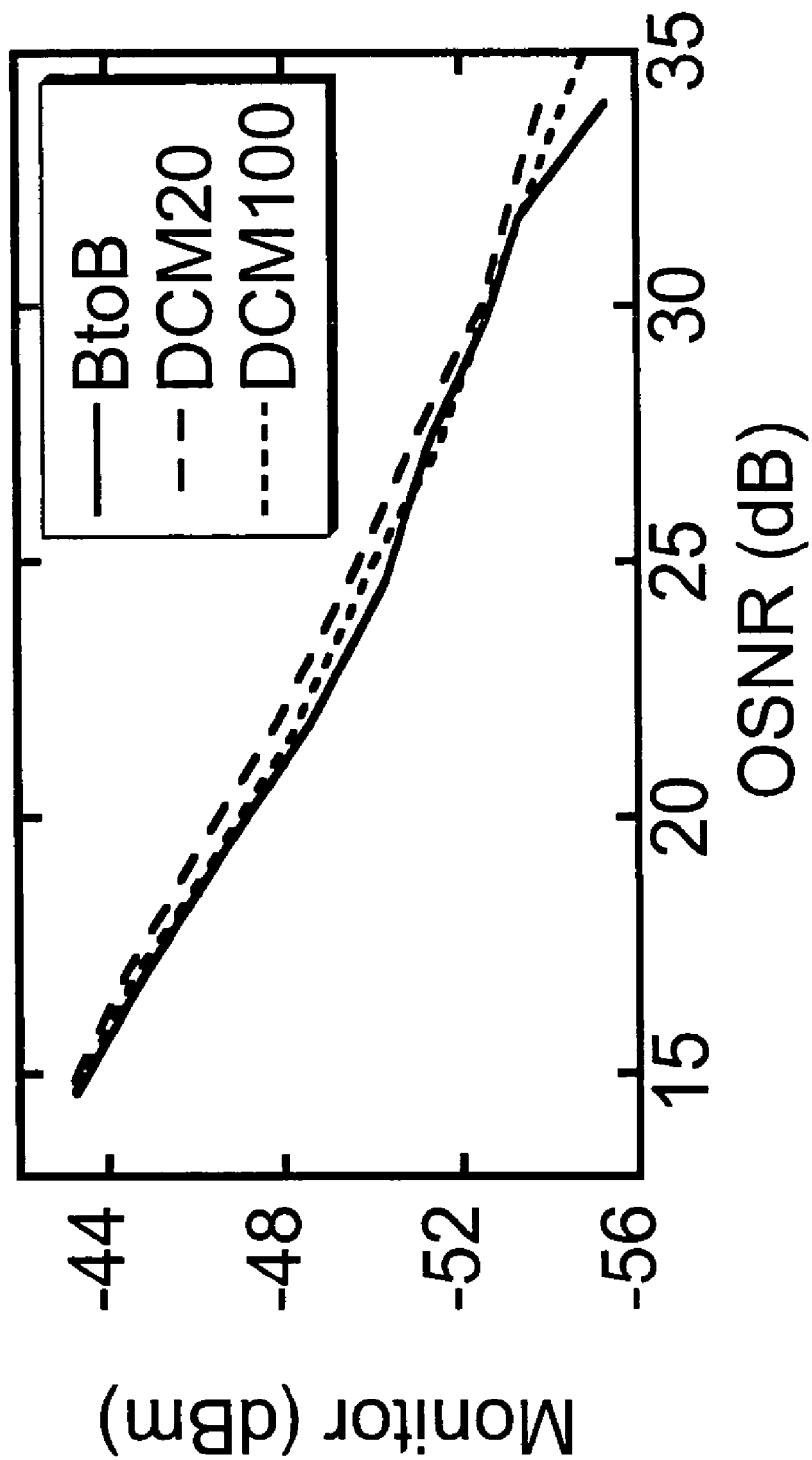
FIG. 3 is a plot of the RF power of a PSK signal at low RF frequencies as a function of optical signal-to-noise ratio.
Figure 4:
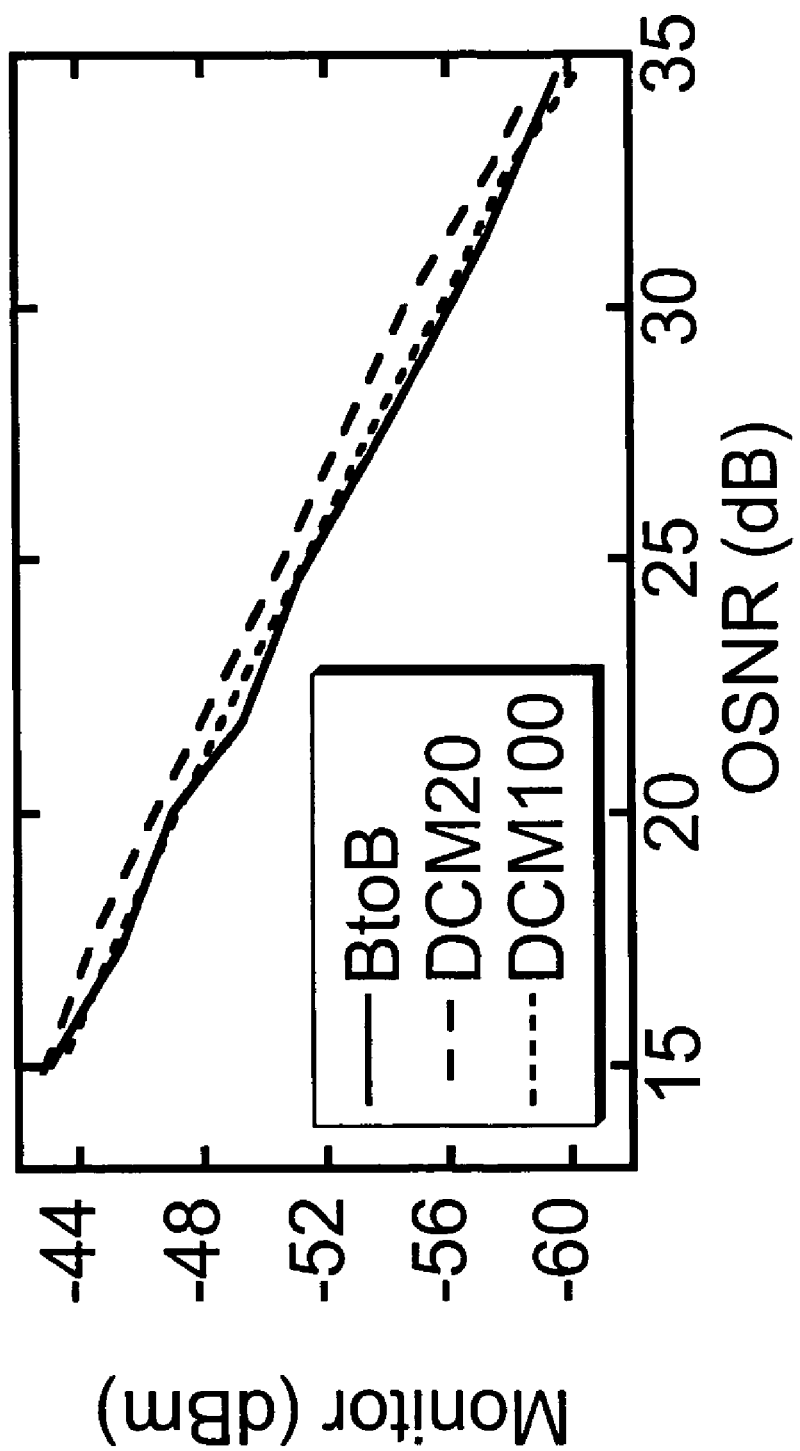
FIG. 4 is a plot of the RF power of a PSK signal at low RF frequencies without data encoding as a function of optical signal-to-noise ratio.

FIG. 3 displays the monitored power as a function of the optical signal-to-noise ratio (OSNR). Such ratio was calculated as the ratio of the power of the signal to the spectral density of the ASE in a reference bandwidth equal to 0.1 nm, and is commonly used to quantify the degradation of a signal in the presence of ASE. Three curves are presented in FIG. 3, and were measured for back-to-back operation (i.e. without dispersion), after the DCM20 and after the DCM100. As expected, the monitored power increases when the noise is increased, but shows a slight saturation at high OSNR because of the presence of RF power from the signal. As can be understood from FIG. 4, turning the data modulation off removes the saturation behavior. The three curves presented in FIG. 4 were measured for back-to-back operation (i.e. without dispersion), after the DCM20 and after the DCM100. At an OSNR of 30 dB, the noise from the data-modulation increases the monitored power by about 4 dB. Such a monitor is sensitive to all sources of noise degrading the signal that have RF power in the monitored range, for example the pattern-dependent amplitude fluctuations due to the limited bandwidth of the MZM used for data modulation. The monitor does not depend significantly upon chromatic dispersion, as can be seen on FIG. 3 and FIG. 4, and it varies by less than 1 dB among the 3 tested situations for a given OSNR. This translates, for example, into a 1.2 dB error on the measured OSNR at a measured RF power of −49 dBm when data modulation is present.

Figure 5:
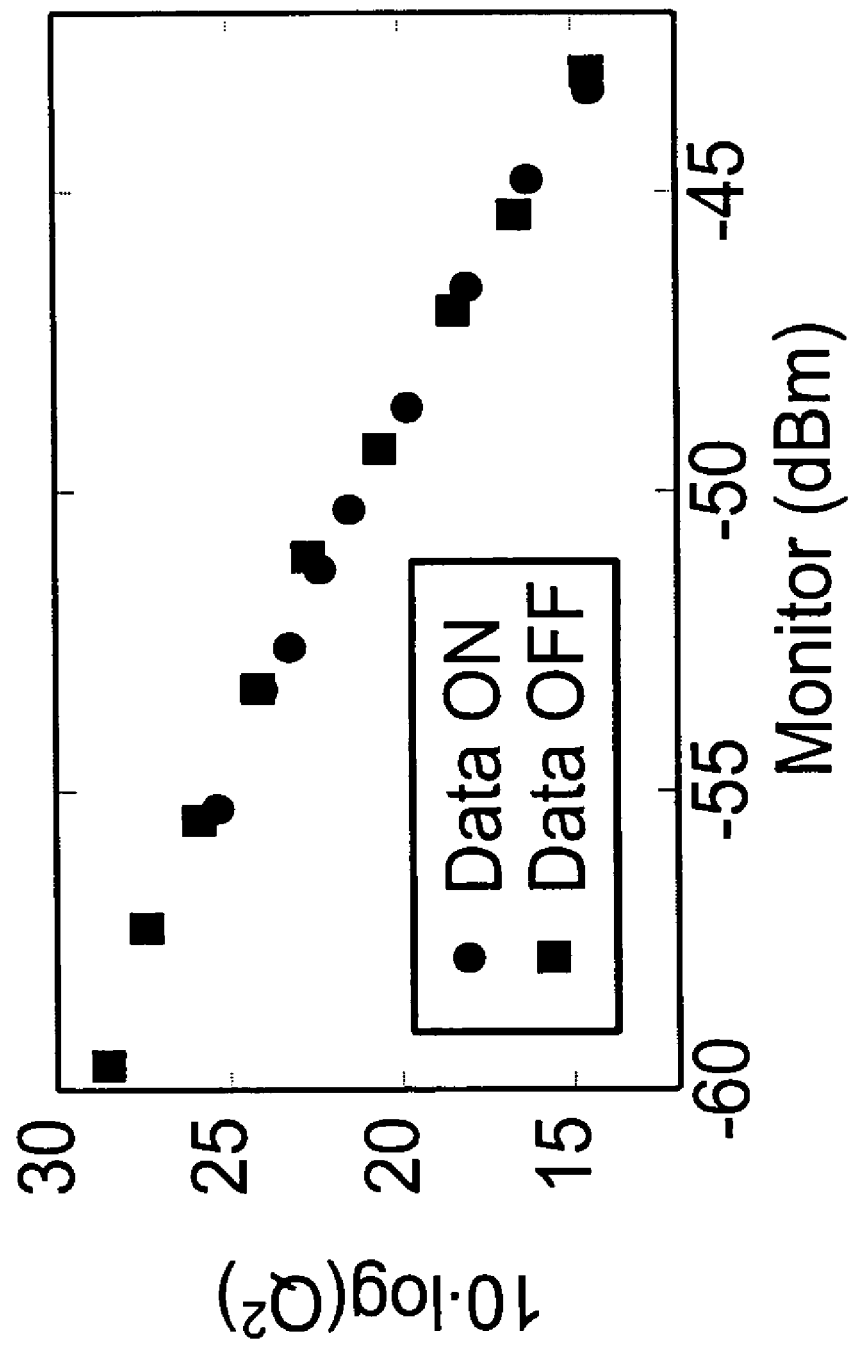
FIG. 5 is a plot illustrating the degradation of the temporal quality of a PSK signal as a function of the RF power measured at low RF frequencies.

Another measure of the degradation of the signal can be obtained using Q, which is the ratio of the average value of the temporal intensity of the signal at a given point in the eye diagram (typically at the maximum) to the variance of the noise on the intensity at the same point. FIG. 5 displays the value of $10 \cdot \log(Q^2)$ measured with a high-speed sampling oscilloscope as a function of the monitor signal with and without data encoding for a variation of the OSNR from 13 to 33 dB. These results are indicative of the usefulness of the present invention to track ASE impairment.

Although the monitor provides a signal that is inversely proportional to the ASE-induced intensity noise on the pulses of the phase-shift keyed channel when no other noise is present, it actually measures the spectral overlap of the ASE with the signal, i.e. gives some intrinsic measure of the OSNR. It can be appreciated by those skilled in the art that dispersion would quickly decrease the value of Q even in the absence of noise, and a monitoring technique directly measuring Q would have little sensitivity to noise at a point in the network where pulses are spread in time.

In another aspect of the invention, the properties of the RF spectrum of a PSK signal are used to provide a method to monitor the bias drift of a data modulator for PSK signals. Such encoding is typically performed with an x-cut Mach-Zehnder modulator (MZM) biased at extinction driven by an AC-coupled non-return to zero voltage.

Indeed, phase shifts exactly equal to 0 or $\pi$ can be encoded thanks to the change of sign of the transmission of the MZM, therefore allowing optimal detection sensitivity. One critical issue when using such modulator is the drift of the bias induced by environmental conditions, aging or charge transport. Operating close to the extinction point within a fraction of the voltage required to get a $\pi$ phase shift $V_\pi$ is critical for DPSK data encoding, as well as for analog modulation.

Figure 6:
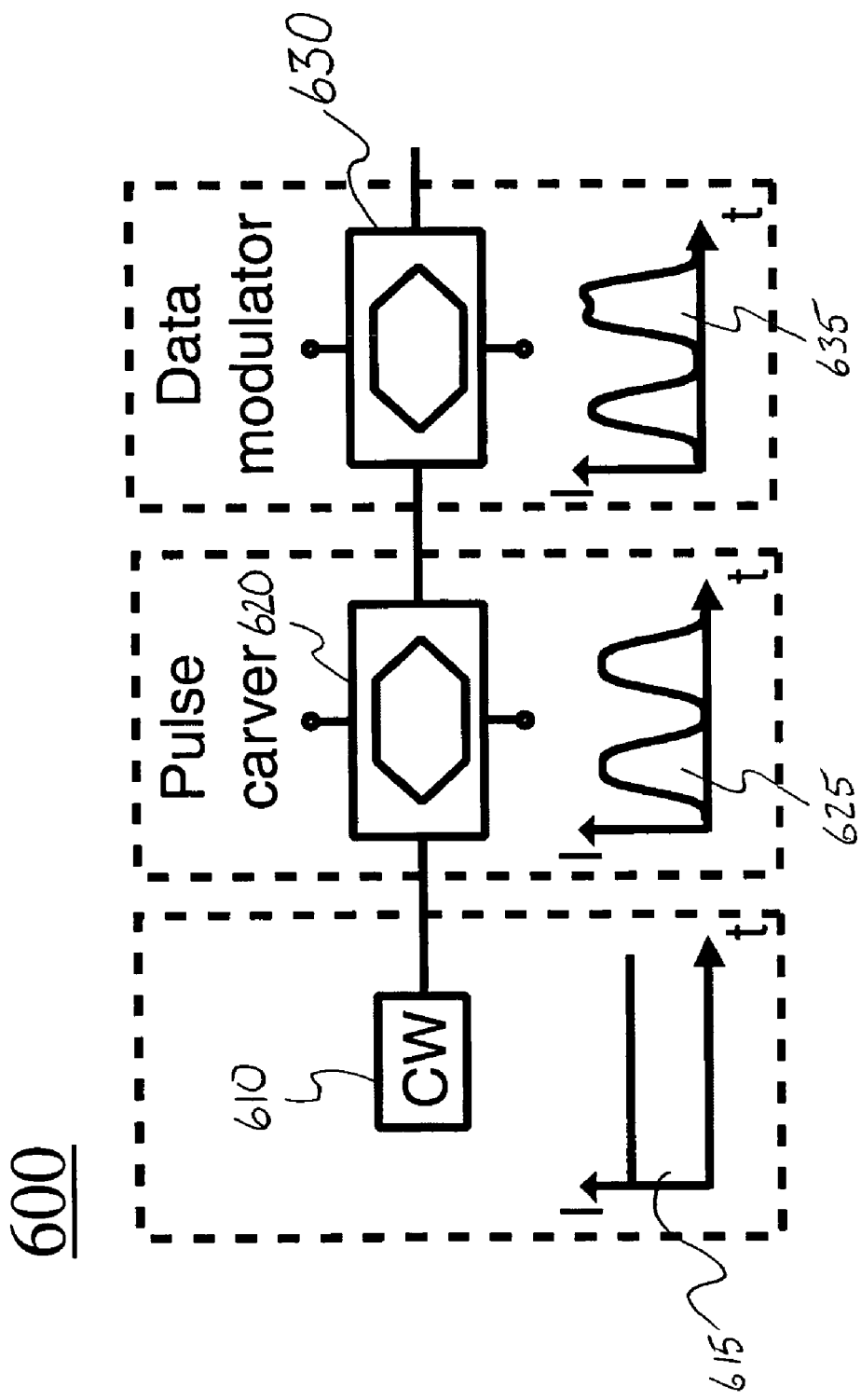
FIG. 6 is a diagram illustrating a PSK transmitter.

A schematic of a return-to-zero (RZ) PSK transmitter 600 is displayed in FIG. 6. The CW laser 610 delivers a substantially constant temporal intensity as shown in the accompanying plot 615. Such an optical source is directed to a temporal modulator 620, which, in our illustrative experiment is a Mach-Zehnder modulator. The modulator 620 serves as a pulse carver to carve a train of pulses with substantially identical temporal intensities, as shown in the accompanying plot 625. Data-encoding by modulation of the phase of the pulses by either 0 or $\pi$ is then performed using an x-cut $LiNbO_3$ Mach-Zehnder modulator 630 biased at extinction. As shown in plot 635 of FIG. 6, an unbalancing of the driving conditions of the data modulator leads to encoded pulses with different temporal intensities.

For perfect biasing conditions, the temporal transmissions associated to the two different phase levels are identical, but improper biasing leads to different temporal transmissions. This leads to a waveform composed of pulses with intensities $I_1(t)$ or $I_2(t)$ at a rate 1/T. Adjacent pulses are assumed non-overlapping, there is no correlation between non-identical bits, and the intensities $I_1$ and $I_2$ are equally likely. The resulting temporal intensity is:

$$I(t) = \sum_n p_n \cdot I_1(t-nT) + (1-p_n) \cdot I_2(t-nT) \qquad (12)$$

where $p_n$ is either 0 or 1. The power spectral density of such a random process can be calculated as the ensemble average (over the coefficients $p_n$) of the power spectral densities of all the realizations of such a process. As the process of Eq. 12 has infinite energy, the power spectral density is defined according to:

$$S(\Omega) = \lim_{T \to \infty} \left\langle \frac{|\tilde{I}_T(\Omega)|^2}{T} \right\rangle \qquad (13)$$

where $\tilde{I}_T$ if the Fourier transform of the intensity given by Eq. 13 truncated to an interval of duration T, and the brackets represent the averaging over all realizations of the coefficients $p_n$. Using the average values of $p_n \cdot p_m$, $(1-p_n) \cdot p_m$, $p_n \cdot (1-p_m)$ and $(1-p_n) \cdot (1-p_m)$ and the fact that $$\sum_n \exp(in\Omega T) = \frac{2\pi}{T} \sum_n \delta\left(\Omega - \frac{2\pi n}{T}\right), \text{ we obtain:} \qquad (14)$$

$$S(\Omega) = \frac{1}{4T}\left[|\tilde{I}_1(\Omega) - \tilde{I}_2(\Omega)|^2 + \frac{2\pi}{T}|\tilde{I}_1(\Omega) + \tilde{I}_2(\Omega)|^2 \cdot \sum_n \delta\left(\Omega - \frac{2\pi n}{T}\right)\right]$$

The RF spectrum of such a process has a discrete and a continuous component. The continuous component is proportional to the spectrum of $I_1-I_2$ while discrete tones proportional to the spectrum of $I_1+I_2$ are present at the clock frequency and its harmonics.

Using Eq. 14, the RF power of the generated PSK signal is proportional to $|\tilde{I}_1(\Omega) - \tilde{I}_2(\Omega)|^2$ if $\Omega$ is not the frequency of the clock or one of its harmonics. For an $\Omega$ which is negligible compared to the bandwidth of the pulses $I_1$ and $I_2$, the RF power can be approximated by $|\tilde{I}_1(0) - \tilde{I}_2(0)|^2$. As $\tilde{I}_1(0)$ and $\tilde{I}_2(0)$ are respectively the integrated temporal intensity of the two fundamental pulses $I_1$ and $I_2$ (i.e. their energies $\epsilon_1$ and $\epsilon_2$), the RF power scales like the square of the energy offset $|\epsilon_1-\epsilon_2|^2$ between the pulses corresponding to 0 and $\pi$. Such offset is representative of the degradation on the PSK signal, and should be equal to zero for perfectly symmetric driving conditions.

Figure 7:
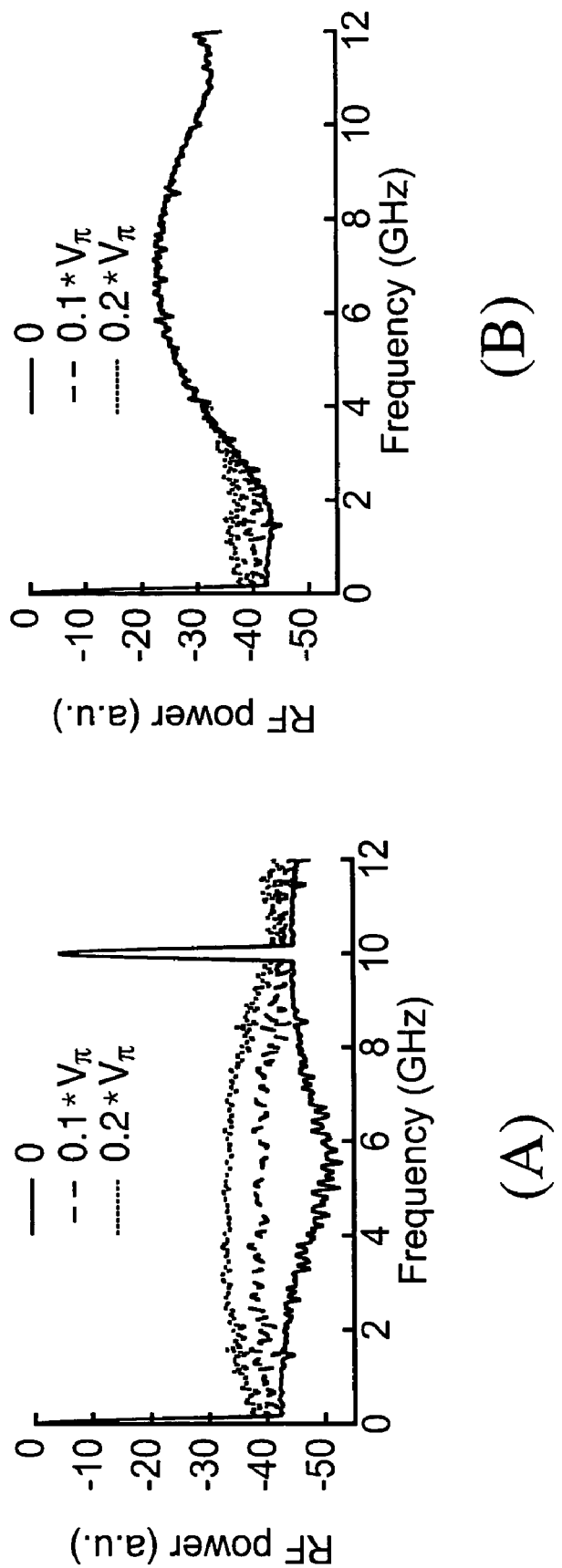
FIGS. 7A-B are plots showing a simulated RF spectrum for a PSK signal for three different values of the bias drift, with and without dispersion.

Simulations of the RF spectrum of a 10 Gb/s 50% return-to-zero DPSK signal for bias offsets equal to 0, $0.1 \times V_\pi$, and $0.2 \times V_\pi$ are presented in FIGS. 7 A-B. The simulation includes the group velocity mismatch between optical and electrical waves in the data-modulator, which leads to pattern dependence and gives RF power at frequencies not equal to the clock or its harmonics even in perfect biasing conditions. In the back-to-back case, FIG. 7A, the RF power increases at all RF frequencies when the bias is offset. The RF spectrum calculated for these three biasing conditions after chromatic dispersion (D) equal to 1700 ps.nm$^{-1}$, i.e. 100 km of standard single-mode fiber, is displayed in the plot of FIG. 7B. Although chromatic dispersion may distort the RF spectrum in the high frequency range, the RF power at frequencies significantly lower than $$\frac{2\pi}{D \cdot \Delta\lambda},$$

where $\Delta\delta$ is the signal optical spectral bandwidth, is expected to be unaffected. FIG. 7B shows that the RF spectrum is unaffected by dispersion for frequencies smaller than 2 GHz, and the RF power at low frequency changes similarly with the bias offset with and without dispersion.

Monitoring of the bias offset can therefore be done essentially independently of the chromatic dispersion present on the channel. It is noted that this property is not a direct consequence of our derivation, as adjacent pulses in such case have a significant temporal overlap, and the intensity of the source cannot be written as a sum according to Eq. 12.

An experimental demonstration of one embodiment of a method for bias monitoring according to the present invention was performed on a 10 Gb/s 50% return-to-zero DPSK signal. Pulse carving was performed with a LiNbO$_3$ MZM driven at 10 GHz. Data modulation was implemented with an x-cut LiNbO$_3$ MZM with a V$_\square$ equal to 4.7 volts driven by a $2^{23}-1$ pseudo-random bit sequence. The RF power was measured with a 1 GHz photodetector whose output was band-pass filtered between 100 kHz and 10 MHz and amplified by a factor of 5. The RF power in a 2 MHz bandwidth around 6 MHz was measured with a RF spectrum analyzer.

Although the measurement of the RF spectral density of the optical source was implemented in the demonstration using an RF spectrum analyzer, this is not required and should not be considered as a limit of the scope of the present invention.

As discussed above, other techniques to measure the RF spectrum of an optical source may be employed in accordance with the present invention. For example, the second order intensity autocorrelation of a source, which can be obtained using the nonlinear interaction of two replicas of the source under test, is the Fourier transform of the RF spectrum. Therefore, the RF spectrum can be obtained from the second order intensity autocorrelation.

Another approach to the measurement of the RF spectrum, particularly adapted to the measurement of the spectral density at low RF frequencies, relies on the measurement of the temporal intensity of the source under test followed by a numerical Fourier transform and squaring.

Figure 8:
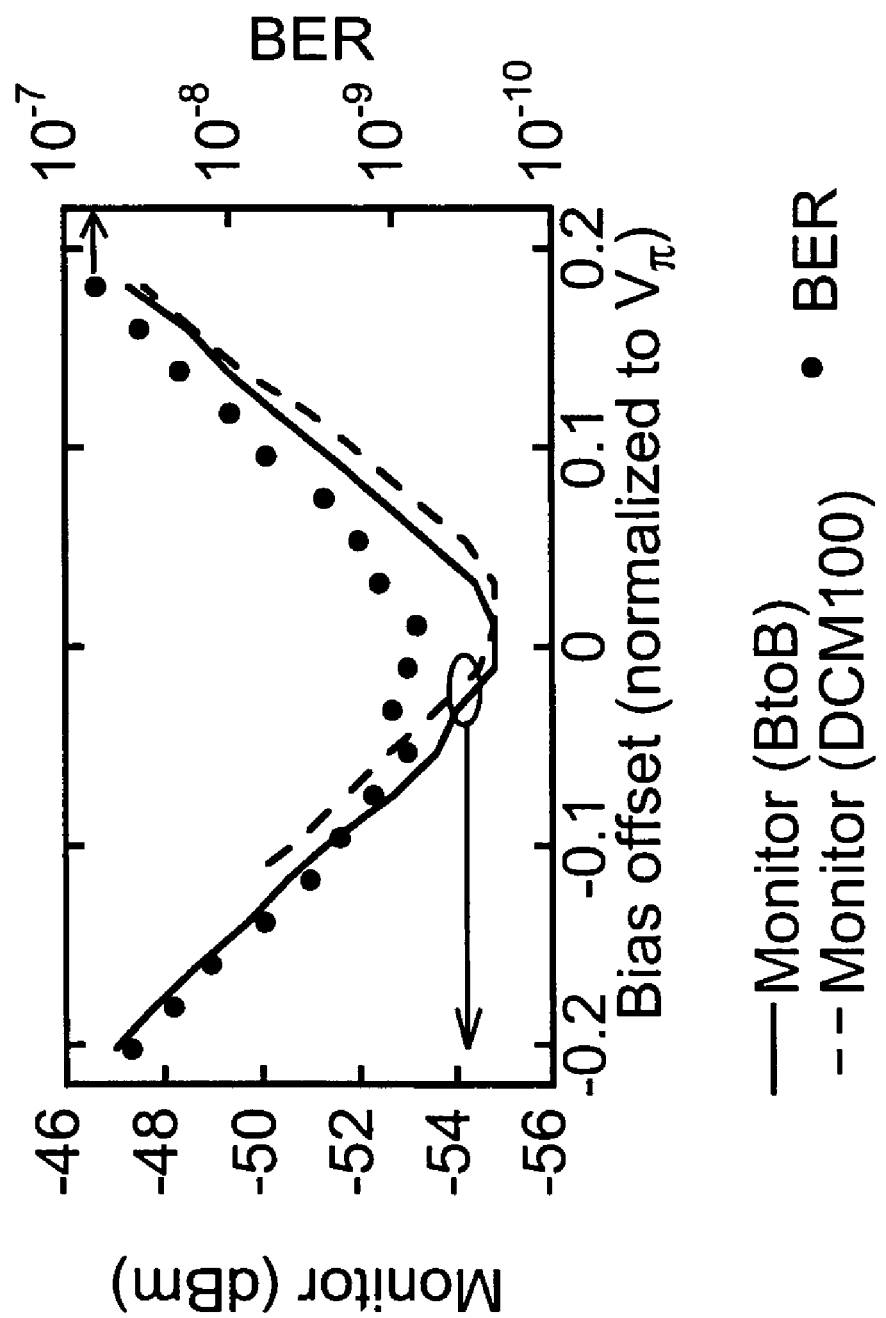
FIG. 8 is a plot showing the bit-error rate and RF power measured at low RF frequencies of a PSK signal as a function of the bias drift.

The signal was monitored after the data modulator and after a dispersion-compensating module introducing chromatic dispersion equal to −1633 ps.nm$^{-1}$. The bit-error rate (BER) was monitored after the data modulator when reducing the OSNR to 13 dB in order to get reproducible measurements. FIG. 8 displays the measured BER and monitored signals as a function of the bias offset. As can be seen from FIG. 8, the RF powers measured either for back-to-back or after dispersion are minimal for values of the bias within a few percent of the optimal value for BER. Simulations show that a slight asymmetry in the drive voltages corresponding to the phase levels can introduce chirp and an asymmetry of the BER curve around the zero-bias position, which explains the slight offset between the optimal values of the bias for the RF power and the BER. The monitored signal changed by 8 dB when the bias was modified by 20% of V$_\pi$. The total power after the modulator only changed by 0.3 dB over this range of bias offset.

Although the invention has been described with reference to illustrative embodiments, this description should not be construed in a limiting sense. Various modifications of the described embodiments, as well as other embodiments of the invention, which are apparent to persons skilled in the art to which the invention pertains, are deemed to lie within the principle and scope of the invention as expressed in the following claims. For example, those skilled in the art will appreciate that the present invention may be advantageously implemented in substantially any application where it is desirable to quantify the variations of the temporal intensity of a phase-encoded optical source.

The invention claimed is:

1. A method for monitoring an optical PSK signal comprising:
   measuring the RF spectrum of the PSK signal; and
   determining the power spectral density of noise on the PSK signal within one or more frequency ranges excluding the clock frequency and harmonics of the frequency,
   wherein measuring the RF spectrum is performed using a measurement of the temporal intensity of a source under test followed by a numerical Fourier transform and squaring.

2. The method of claim 1 further comprising determining a measure of the degradation of the PSK signal due to the noise.

3. The method of claim 1 wherein measuring the RF spectrum is performed using an RF spectrum analyzer.

4. The method of claim 1 wherein measuring the RF spectrum is performed using second order intensity autocorrelation of a source.

5. The method of claim 1 wherein the optical PSK signal is a signal selected from the group consisting of DPSK, DQPSK, □/2-DPSK, and M-ary PSK.

6. A method for monitoring ASE noise on an optical PSK signal comprising:
   measuring the RF spectrum of the PSK signal; and
   determining the power spectral density of ASE noise on the PSK signal within a predetermined frequency range,
   wherein measuring the RF spectrum is performed using a measurement of the temporal intensity of a source under test followed by a numerical Fourier transform and squaring.

7. The method of claim 6 further comprising determining a measure of the degradation of the PSK signal due to the ASE noise.

8. The method of claim 6 wherein the predetermined frequency range is a low frequency range.

9. The method of claim 6 wherein measuring the RF spectrum is performed using an RF spectrum analyzer.

10. The method of claim 6 wherein measuring the RF spectrum is performed using second order intensity autocorrelation of a source.

11. The method of claim 6 wherein the optical PSK signal is a signal selected from the group consisting of DPSK, DQPSK, □/2-DPSK and M-ary PSK.

12. A method for monitoring the bias drift of a PSK data modulator comprising:
   measuring the RF spectrum of a PSK signal generated by the PSK data modulator;
   determining the power spectral density of the PSK signal within a predetermined frequency range; and
   determining the degradation of the PSK signal due to the bias drift of the PSK data modulator based on the spectral density within the predetermined frequency range.

13. The method of claim 12 wherein the predetermined frequency range excludes the clock frequency and harmonics of the clock frequency.

14. The method of claim 12 wherein the predetermined frequency range is a low frequency range.

15. The method of claim 12 wherein measuring the RF spectrum is performed using an RF spectrum analyzer.

16. The method of claim 12 wherein measuring the RF spectrum is performed using a measurement of the temporal intensity of a source under test followed by a numerical Fourier transform and squaring.

17. The method of claim 12 wherein measuring the RF spectrum is performed using second order intensity autocorrelation of a source.

18. The method of claim 12 wherein the optical PSK signal is a signal selected from the group consisting of DPSK, DQPSK, □/2-DPSK and M-ary PSK.

19. A method of controlling the bias of a PSK data modulator comprising:
   measuring the RF spectrum of a PSK signal generated by the PSK data modulator;
   determining the power spectral density of the PSK signal within a predetermined frequency range; and
   adjusting the bias of the PSK data modulator to reduce amplitude fluctuation from the PSK data modulator.

20. The method of claim 19 wherein the predetermined frequency range excludes the clock frequency and harmonics of the clock frequency.

21. The method of claim 19 wherein the predetermined frequency range is a low frequency range.

22. The method of claim 19 wherein measuring the RF spectrum is performed using an RF spectrum analyzer.

23. The method of claim 19 wherein measuring the RF spectrum is performed using a measurement of the temporal intensity of a source under test followed by a numerical Fourier transform and squaring.

24. The method of claim 19 wherein measuring the RF spectrum is performed using second order intensity autocorrelation of a source.

25. The method of claim 19 wherein the optical PSK signal is a signal selected from the group consisting of DPSK, DQPSK, □/2-DPSK and M-ary PSK.

26. An apparatus for monitoring an optical PSK signal comprising:
   means for measuring the RF spectrum of the PSK signal; and
   means for determining the power spectral density of noise on the PSK signal within one or more frequency ranges excluding the clock frequency and harmonics of the clock frequency,
   wherein said means for measuring the RF spectrum of the PSK signal measures the temporal intensity of a source undre test followed by a numerical Fourier transform and squaring.

27. An apparatus for monitoring ASE noise on an optical PSK signal comprising:
   means for measuring the RF spectrum of the PSK signal; and
   means for determining the power spectral density of ASE noise on the PSK signal within a predetermined frequency range, wherein said means for measuring the RF spectrum of the PSK signal measures the temporal intensity of a source undre test followed by a numerical Fourier transform and squaring.

28. An apparatus for monitoring the bias drift of a PSK data modulator comprising:

means for determining the power spectral density of a PSK signal generated by the PSK data modulator within a predetermined frequency range; and means for determining the degradation of the PSK signal due to the bias drift of the PSK data modulator based on the power spectral density within the predetermined frequency range.

29. An apparatus for controlling the bias of a PSK data modulator comprising:

means for determining the power spectral density of a PSK signal generated by the PSK data modulator within a predetermined frequency range; and means for adjusting the bias of the PSK data modulator based on the power spectral density of the PSK signal within the predetermined frequency range.

30. The apparatus as in claim 26 wherein said means for measuring the RF spectrum of the PSK signal performs second order intensity autocorrelation of a source.

31. The apparatus as in claim 27 wherein said means for measuring the RF spectrum of the PSK signal performs second order intensity autocorrelation of a source.

* * * * *